P. LABROSSE AND F. ESTÈVE.
CIRCUIT BREAKER FOR MAGNETOS.
APPLICATION FILED MAY 9, 1918.

1,327,284.            Patented Jan. 6, 1920.

Witnesses
Jean Germain
Charles Pirre

Inventors
Paul Labrosse
Felix Estève

UNITED STATES PATENT OFFICE.

PAUL LABROSSE AND FELIX ESTÈVE, OF LYON, FRANCE.

CIRCUIT-BREAKER FOR MAGNETOS.

1,327,284.

Specification of Letters Patent.

Patented Jan. 6, 1920.

Application filed May 9, 1918. Serial No. 233,441.

*To all whom it may concern:*

Be it known that we, PAUL LABROSSE and FELIX ESTÈVE, citizens of the French Republic, residing at Lyon, in France, have invented certain new and useful Improvements in Circuit-Breakers for Magnetos, of which the following is a specification.

The present invention relates to improvements in circuit breakers for high or low tension ignition magnetos.

In order to avoid sparking from extra current between the movable lever carrying the platinated screw and the disk or plate carrying said lever it is known to provide a fiber insulating sleeve between the axle or pivot of this lever and the disk. Since the fiber is apt to absorb moisture, it frequently happens that the sleeve swells and locks the pivot of the lever, causing stoppage of the working of the apparatus.

Moreover, by reason of the force of the back motion spring, the action of the cam or contact finger on the axle of the lever produces abnormal wear of the insulating sleeve causing a sliding movement of the platinated screws against one another when the lever is actuated.

The present invention obviates these drawbacks.

Figure 1:
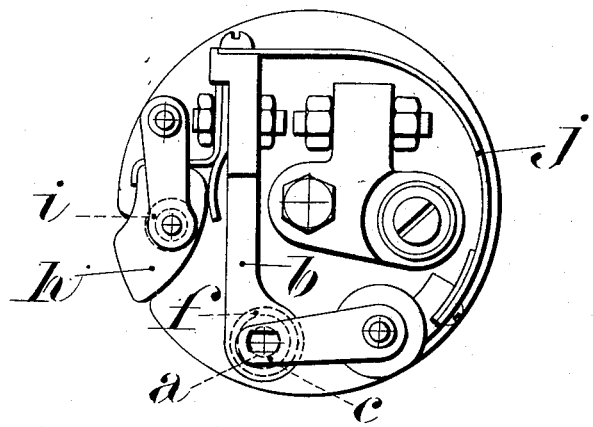
Figure 1 is a view in elevation of the improved circuit breaker.
Figure 2:
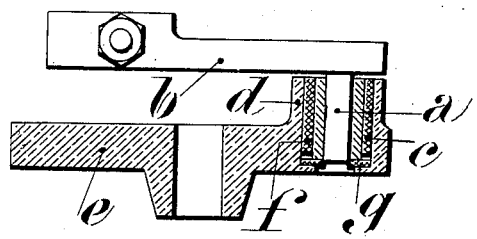
Fig. 2 is a longitudinal section through the axle of the lever.
Figure 3:
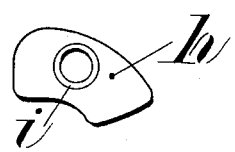
Fig. 3 is a view in plan of the contact finger.

The axle *a* of the pawl *b* rotates in a metal ring *c* insulated in the projection *d* of the disk *e* by an insulating sleeve *f* made of fiber or any other insulating material and insulated underneath by a washer *g* of the same material.

Further the eye of the finger *h* of fiber or other insulating material is lined with a metal ring *i*.

By such construction the friction is only produced on metal surfaces of which the wear and tear is practically *nil* so that the mechanism will be maintained in good working order for an indefinite time.

Finally, the back-motion spring *j* of the pawl acts on the latter at its end remote from its rocking axle. This spring thus works on the greatest leverage which only necessitates very slight spring power reducing the consequent wear and tear to the minimum, as well as the shocks on the cams.

What we claim as our invention and desire to secure by Letters Patent of the United States is:—

In a device of the character described, a pawl, a back motion spring therefor, an axle thereon, a disk, an extension thereon provided with a bore into which said axle extends, an annular seating at one end of said bore, a metal ring within said bore in which said axle rotates, a sleeve constructed of insulating material between said ring and the face of said bore, a washer of insulating material between said annular seating and the inner ends of said metal ring and insulating sleeve, a contact finger constructed of insulating material having an eye, a pivot extending into said eye and a metal ring fixed in said eye and surrounding said pivot.

In witness whereof we have signed this specification in the presence of two witnesses.

PAUL LABROSSE.
FELIX ESTÈVE.

Witnesses:
 YEAN GERMAIN,
 GRADY CORBETT.